United States Patent
Sugden et al.

(10) Patent No.: US 9,836,889 B2
(45) Date of Patent: *Dec. 5, 2017

(54) EXECUTABLE VIRTUAL OBJECTS ASSOCIATED WITH REAL OBJECTS

(71) Applicant: Microsoft Technology Licensing, LLC, Redmond, WA (US)

(72) Inventors: Ben Sugden, Woodinville, WA (US); John Clavin, Seattle, WA (US); Ben Vaught, Seattle, WA (US); Stephen Latta, Seattle, WA (US); Kathryn Stone Perez, Kirkland, WA (US); Daniel McCulloch, Kirkland, WA (US); Jason Scott, Kirkland, WA (US); Wei Zhang, Redmond, WA (US); Darren Bennett, Seattle, WA (US); Ryan Hastings, Seattle, WA (US); Arthur Tomlin, Bellevue, WA (US); Kevin Geisner, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,967

(22) Filed: Mar. 1, 2017

(65) Prior Publication Data

US 2017/0178410 A1 Jun. 22, 2017

Related U.S. Application Data

(60) Continuation of application No. 14/951,299, filed on Nov. 24, 2015, now Pat. No. 9,594,537, which is a
(Continued)

(51) Int. Cl.
*G02B 27/01* (2006.01)
*G06T 19/00* (2011.01)
(Continued)

(52) U.S. Cl.
CPC ........ *G06T 19/006* (2013.01); *G02B 27/0172* (2013.01); *G06F 3/013* (2013.01);
(Continued)

(58) Field of Classification Search
None
See application file for complete search history.

(56) References Cited

U.S. PATENT DOCUMENTS

| 8,469,824 B1 | 6/2013 | Farley et al. |
| 2008/0030429 A1 | 2/2008 | Hailpern et al. |

(Continued)

OTHER PUBLICATIONS

Gleue, T. et al., "Design and Implementation of a Mobile Device for Outdoor Augmented Reality in the Archeoguide Project," 2001 Conference on Virtual Reality, Archaeology, and Cultural Heritage, Nov. 28, 2001, Athens, Greece, 8 pages.
(Continued)

*Primary Examiner* — Nicholas Lee
(74) *Attorney, Agent, or Firm* — Alleman Hall Creasman & Tuttle LLP

(57) ABSTRACT

Embodiments for interacting with an executable virtual object associated with a real object are disclosed. In one example, a method for interacting with an executable virtual object associated with a real object includes receiving sensor input from one or more sensors attached to the portable see-through display device, and obtaining information regarding a location of the user based on the sensor input. The method also includes, if the location includes a real object comprising an associated executable virtual object, then determining an intent of the user to interact with the executable virtual object, and if the intent to interact is determined, then interacting with the executable object.

20 Claims, 6 Drawing Sheets

Related U.S. Application Data continuation of application No. 14/602,746, filed on Jan. 22, 2015, now Pat. No. 9,201,243, which is a division of application No. 13/360,281, filed on Jan. 27, 2012, now Pat. No. 8,963,805.

(51) Int. Cl.
  *G06F 3/01* (2006.01)
  *G06F 3/16* (2006.01)

(52) U.S. Cl.
  CPC .............. *G06F 3/017* (2013.01); *G06F 3/167* (2013.01); *G02B 2027/014* (2013.01); *G02B 2027/0138* (2013.01); *G02B 2027/0141* (2013.01); *G02B 2027/0178* (2013.01)

(56) References Cited

U.S. PATENT DOCUMENTS

| | | |
|---|---|---|
| 2009/0033588 A1 | 2/2009 | Kajita et al. |
| 2009/0100063 A1 | 4/2009 | Bengtsson et al. |
| 2010/0023878 A1 | 1/2010 | Douris et al. |
| 2010/0076968 A1 | 3/2010 | Boyns et al. |
| 2011/0059759 A1 | 3/2011 | Ban |
| 2011/0213664 A1 | 9/2011 | Osterhout et al. |
| 2012/0001938 A1 | 1/2012 | Sandberg |
| 2012/0327116 A1 | 12/2012 | Liu et al. |
| 2013/0093789 A1 | 4/2013 | Liu et al. |
| 2013/0174213 A1 | 7/2013 | Liu et al. |
| 2014/0002495 A1 | 1/2014 | Lamb et al. |

OTHER PUBLICATIONS

Dahne, P. et al., "Archeoguide: System Architecture of a Mobile Outdoor Augmented Reality System," International Symposium on Mixed and Augmented Reality, Sep. 30, 2002, Darmstadt, Germany, 2 pages.

Fritz, F. et al., "Enhancing Cultural Tourism Experiences with Augmented Reality Technologies," 6th International Symposium on Virtual Reality, Archaeology, and Cultural Heritage, Nov. 8, 2005, Pisa, Italy, 6 pages.

Hughes, C. et al., "The Evolution of a Framework for Mixed Reality Experiences," Chapter 10 of "Emerging Technologies of Augmented Reality: Interfaces and Design: Interfaces and Design," IGI Global, Nov. 30, 2006, pp. 198-217.

United States Patent and Trademark Office, Non-Final Office Action Issued in U.S. Appl. No. 13/360,281, dated May 28, 2014, 10 pages.

United States Patent and Trademark Office, Notice of Allowance Issued in U.S. Appl. No. 13/360,281, dated Oct. 20, 2014, 7 pages.

United States Patent and Trademark Office, Notice of Allowance Issued in U.S. Appl. No. 14/602,746, dated Aug. 4, 2015, 8 pages.

United States Patent and Trademark Office, Non-Final Office Action Issued in U.S. Appl. No. 14/951,299, dated Feb. 2, 2016, 4 pages.

United States Patent and Trademark Office, Non-Final Office Action Issued in U.S. Appl. No. 14/951,299, dated Jun. 8, 2016, 4 pages.

United States Patent and Trademark Office, Notice of Allowance Issued in U.S. Appl. No. 14/951,299, dated Nov. 7, 2016, 9 pages.

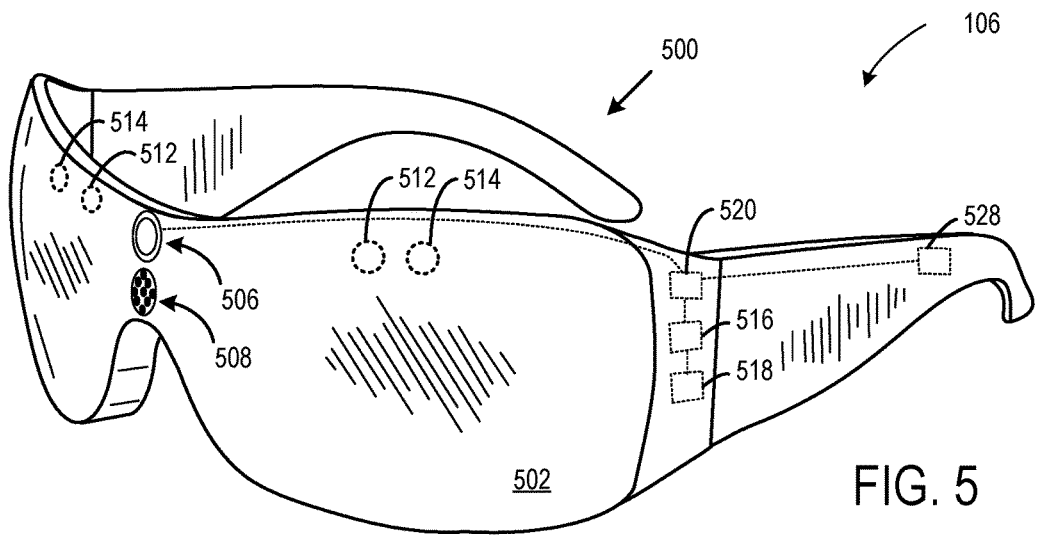
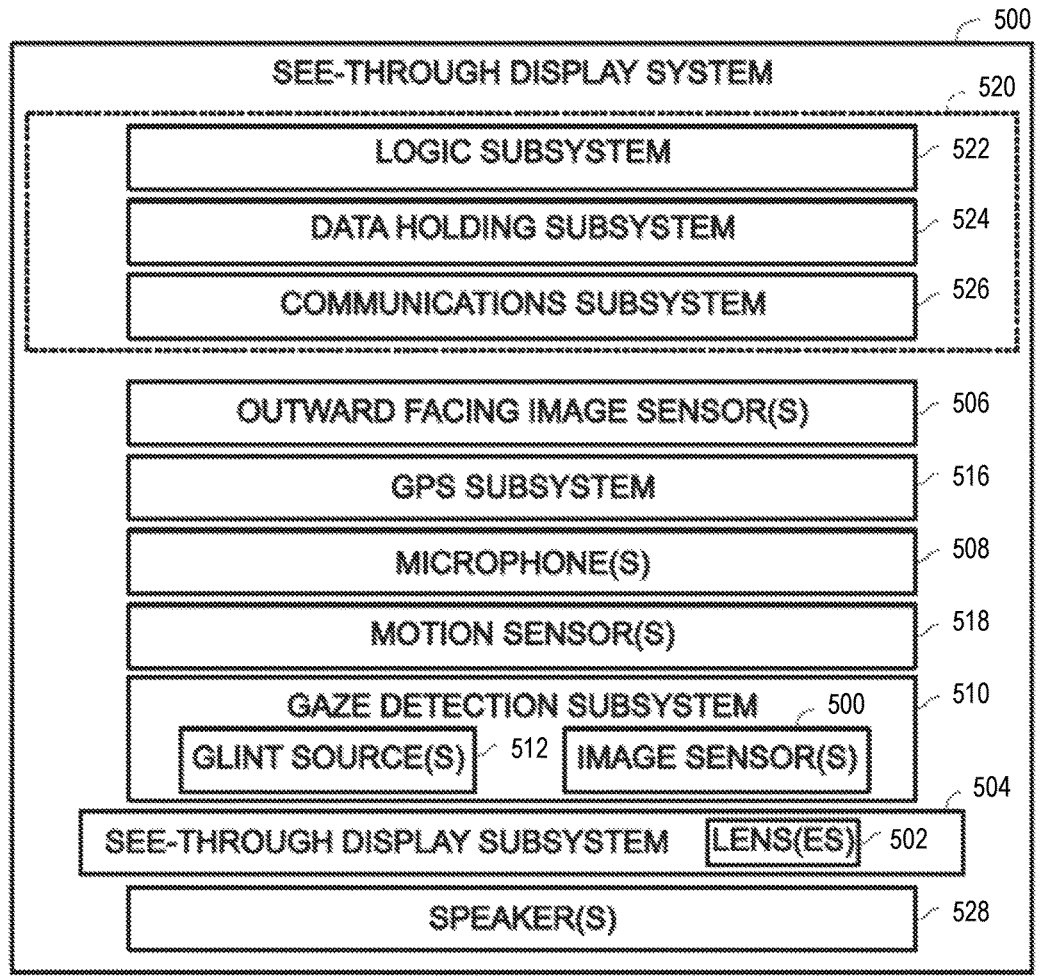
FIG. 6

EXECUTABLE VIRTUAL OBJECTS ASSOCIATED WITH REAL OBJECTS

CROSS REFERENCE TO RELATED APPLICATIONS

This application is a continuation of U.S. patent application Ser. No. 14/951,299, filed Nov. 24, 2015, which is a continuation of U.S. patent application Ser. No. 14/602,746 filed Jan. 22, 2015, now U.S. Pat. No. 9,201,243, which is a divisional of U.S. patent application Ser. No. 13/360,281, filed on Jan. 27, 2012, now U.S. Pat. No. 8,963,805, each of which are hereby incorporated by reference.

BACKGROUND

When visiting a location, a person may wish to acquire information about objects of interest at the location. For example, when visiting a tourist attraction, the person may wish to acquire geological information about the attraction, historical information regarding events that have occurred at the location, etc. This information may be looked up in a book or computer, or given vocally by a tour guide, for example. However, these options may be limited at many locations.

SUMMARY

Embodiments for interacting with an executable virtual object associated with a real object via a portable see-through display device are disclosed. In one example, a method for interacting with an executable virtual object associated with a real object includes receiving sensor input from one or more sensors attached to the portable see-through display device, and obtaining information regarding a location of the user based on the sensor input. The method also includes, if the location includes a real object comprising an associated executable virtual object, then determining an intent of the user to interact with the executable virtual object, and if the intent to interact is determined, then interacting with the executable object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows an example HMD device including a see-through display system according to an embodiment of the present disclosure.

FIG. 6 shows a block diagram of the embodiment of FIG. 5.

DETAILED DESCRIPTION

As mentioned above, when visiting a location, a person may wish to acquire additional information about objects the person views at the location. Thus, embodiments are disclosed herein that relate to executable virtual objects associated with real objects at a location. When the person visits the location with an interactive device, such as a head-mounted see-through display device, the person may discover that one or more virtual objects are associated with one or more corresponding real objects at the location. In response, the person may indicate an intent to interact with a selected virtual object associated with a corresponding selected real object to trigger the launch of the virtual object on the head-mounted display device. In this manner, the person may acquire information related to the selected real object of interest. As explained below, such information may be available to the public generally, to a smaller group of users, or even to a specific user. Thus, the information content may be tailored to any desired person or group of people.

Figure 1:
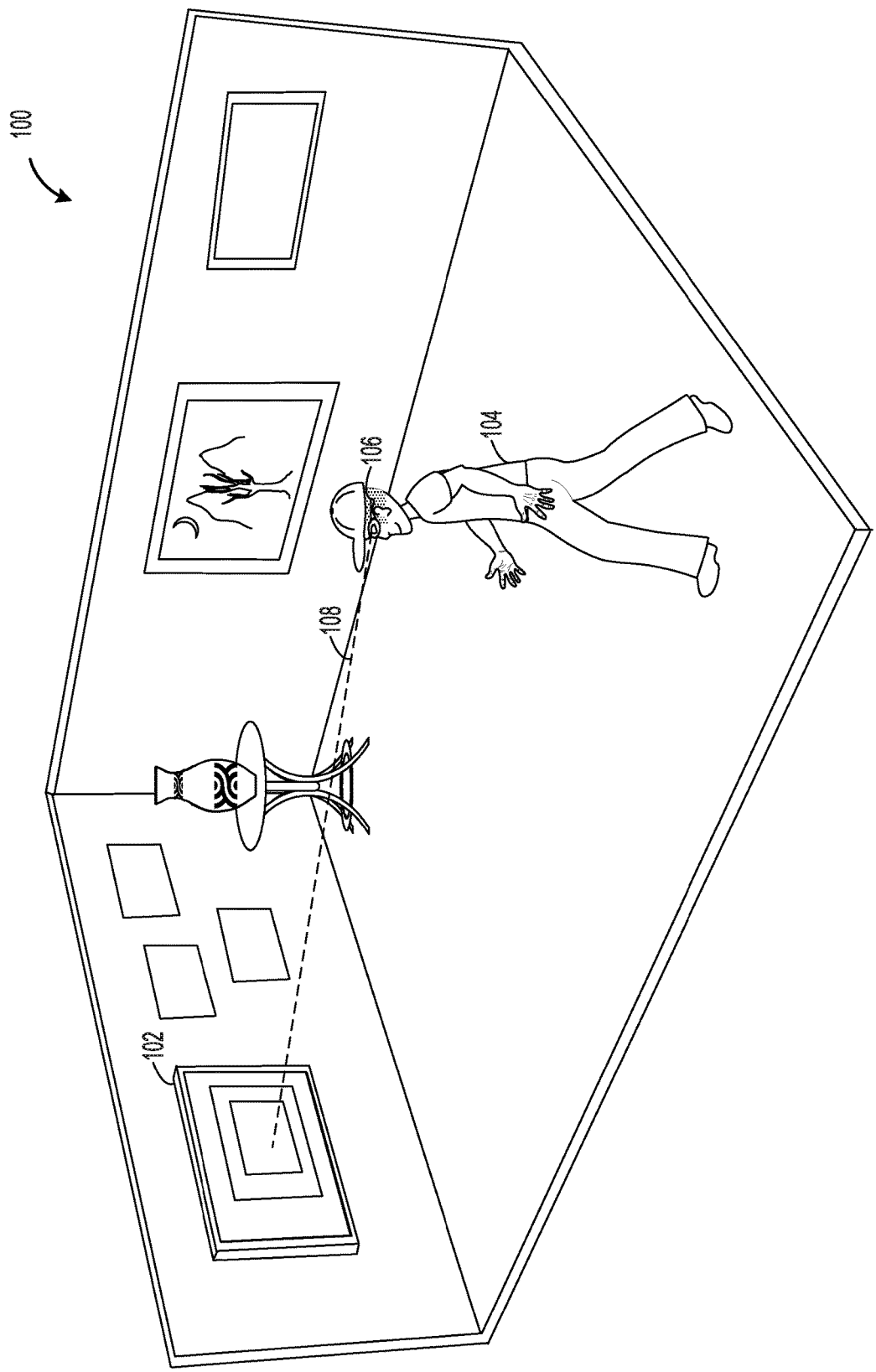
FIG. 1 schematically shows an example physical space including a real object with an associated virtual object.

FIG. 1 shows an example embodiment of a physical space 100 including a real object with an associated virtual object. In the embodiment illustrated in FIG. 1, the physical space 100 comprises an art museum with a painting 102 mounted on a wall. A user 104 is looking at the painting 102 through an embodiment of a portable see-through head mounted display device (HMD) 106.

HMD device 106 may include a see-through display configured to display a virtual reality environment to user 104. Further, the see-through display may be configured to visually augment an appearance of physical space 100 to user 104. In other words, the see-through display allows light from physical space 100 to pass through the see-through display so that user 104 can directly see the actual physical space 100, as opposed to seeing an image of the physical space on a conventional display device. Furthermore, the see-through display may be configured to display one or more virtual objects as an overlay to the actual physical space 100. In this way, the see-through display may be configured so that user 104 is able to view a real object in physical space 100 through one or more partially transparent pixels that are displaying a virtual object.

The painting 102 may include an associated executable virtual object that may be launched, for example, in response to a detected user intent to interact with the virtual object. The associated executable virtual object may be any object that may be executed on the HMD in response to a determined user intent to interact with the object. As non-limiting examples, the virtual object may include image content, audio content, text, an interactive application, an invitation to join an activity, such as a game, occurring at the location of the user, a virtual web page, an invitation to make a phone call, etc. It will be understood that the term "executable virtual object" as used herein signifies any computer-implemented object that may be associated with a real object (e.g. a visually identifiable object, a geographic coordinate, etc.) and presented to a user based upon the association with the real object. Virtually any object, service, or application may be an executable virtual object. Examples include, but are not limited to, applications configured to open a virtual web page, display image data, play audio and/or video data, make a telephone call or perform another communication task, launches another application (e.g. a game), and the like. The virtual object may have been previously associated with a real object by a user at the location (e.g. by a user that wishes to leave a message for a later visitor at that location), or by a user at a different location (e.g. by a developer creating an application for a location based upon previously-acquired image and location data). Additional information regarding example methods of associating a virtual object with a selected real object are described below with respect to FIG. 4.

In some embodiments, when the user 104 looks at a real object that has an associated executable virtual object through the HMD device 106, an indication may be given to the user that the real object includes an associated virtual object. For example, an icon, sound or light emitted by the HMD device 106, or other notification appearing near or on the real object may be displayed on the see-through display of the HMD device. In such cases, user intent to interact with the executable virtual object may be determined prior to launching the virtual object, for example, by determining user intent to interact with the icon. In other embodiments, no indication may be given to the user that a virtual object is associated with the real object, and the virtual object may be launched in response to a determined user intent to interact with the real object.

As described in more detail below, the HMD device 106 may include one or more sensors configured to provide data that may be used to determine a location and orientation of the user 104, and to determine the user's intent to interact with a virtual object associated with a real object. The HMD device 106 may include any suitable sensors. Examples include, but are not limited to, outward facing image sensors, inward facing image sensors, microphones, motion sensors, and global positioning system (GPS) sensors. GPS sensors and/or outward facing image sensors may be used to determine a precise location and orientation of the user (e.g. from GPS coordinate data combined with image data that can be matched with stored image data from that location). The determined location and orientation of the user then may be used to determine if the user's field of view includes any real objects having an associated virtual object. If it is determined that the field of view of the user includes a real object with an associated virtual object, then input from the sensors may be used to determine if the user intends to interact with the virtual object.

For example, referring to FIG. 1, the user is looking at a painting 102 that includes an associated executable virtual object. Input from inward-facing image sensors and outward-facing image sensors on the HMD device 106 may be used to determine that the user's gaze 108 is directed at the painting 102. Upon notification of the availability of the virtual object, an intent of the user to interact with the virtual object then may be determined, for example, from sensor input indicating that the user's gaze 108 is directed at the object for a threshold amount of time. Such an intent may be determined from any suitable gaze duration, including but not limited to durations of 500 msec, 1 second, or 5 seconds. In other embodiments, the user's intent to interact may be determined via voice recognition analysis of audio input received from the user, by outward facing sensor input capturing a hand and/or arm gesture of the user, by inward facing sensor input capturing an eye gesture of a user, by motion data capturing a head (or body) gesture of the user, or via any other suitable input or combination of inputs.

Figure 2:
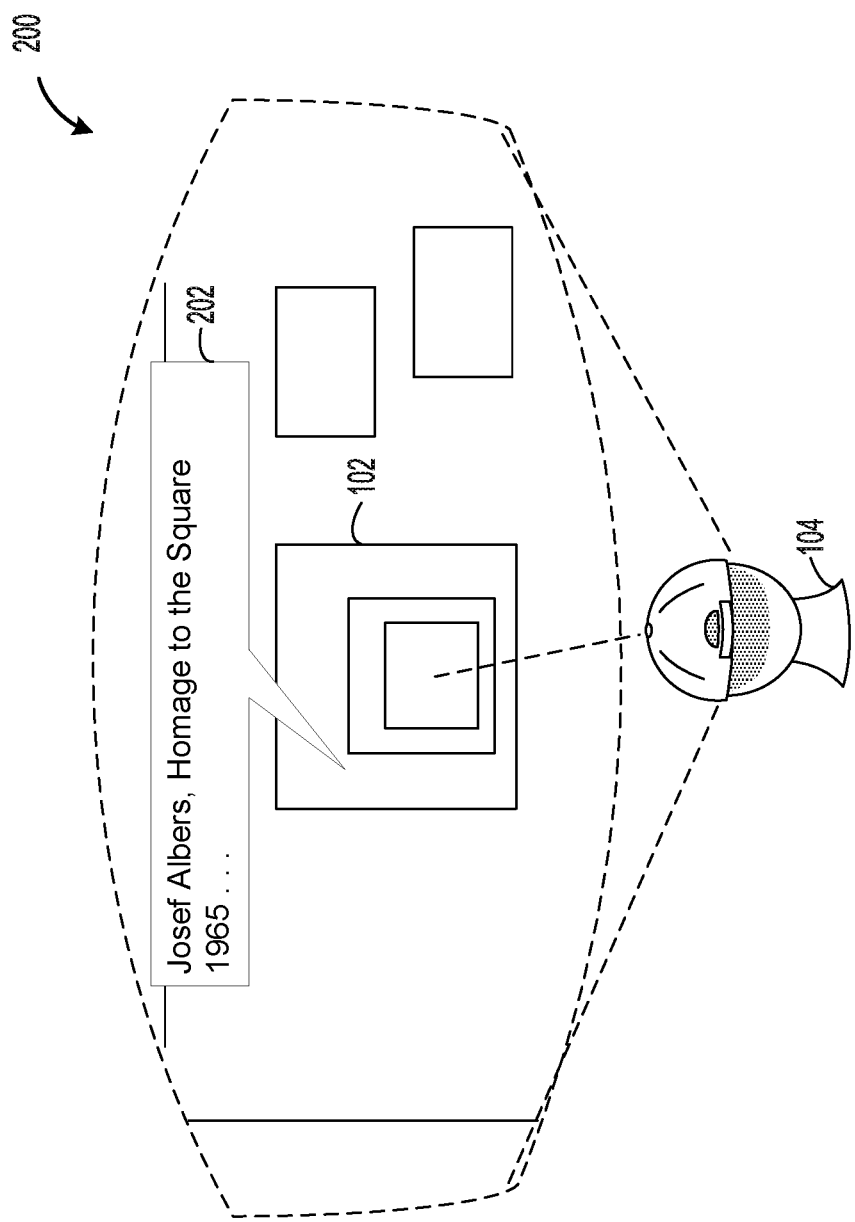
FIG. 2 schematically shows an example field of view of a user including the real and virtual objects of FIG. 1.

Once the intent of the user to interact with the object has been determined, the virtual object may be launched. FIG. 2 shows the field of view 200 of the user 104 of FIG. 1 including the painting 102 after a virtual object 202 associated with the painting 102 has been launched. In the depicted embodiment, the virtual object 202 includes text which is overlaid on the see-through display of the HMD device near the painting 102. The text may include information specific to the real object, e.g., the name of the artist of the painting, the year the painting was created, etc. In another example, the text (or other content) may include information specific to the user viewing the painting. For example, a friend visiting the museum at an earlier date may associate text and/or auditory commentary with the painting for later viewing by the user.

While FIGS. 1 and 2 depict the launching of an executable virtual object associated with a painting, it will be understood that an executable object may be associated with any suitable real object. For example, a tourist attraction with an object that is frequently photographed by visitors may have an associated executable virtual object that includes an audio content item with instructions guiding a user to a precise location and orientation for photographing the object. The instructions may be launched in response to a user wearing an HMD device looking at the tourist attraction and indicating a desire to photograph the attraction via a voice command. Further, each real object of interest at such a location may include its own virtual object. Where multiple real objects having associated virtual objects are visible at one time in the user's field of view, gaze location analysis may be used to determine the real object at which the user is currently gazing by projecting gaze lines from the user's eyes past the lenses of the HMD and into the real world. The virtual object associated with that real object then may be announced and/or launched. Likewise, where more than one virtual object is associated with a particular real object, a determination regarding which virtual object the user wishes to launch may be determined by gaze detection (e.g. displaying an icon for each virtual object and detecting which icon the user selects via gaze, via voice command, or in any other suitable manner).

In another example, the physical space may include a parking lot in which users of an augmented reality game gather to play. In such an environment, a virtual object in the form of an invitation to join the augmented reality game may be associated with a particular object in the parking lot (e.g. a billboard located on a building adjacent the parking lot, a light post in the parking lot, etc.). Such a virtual object may be executed in response to a user looking at the object and manifesting an intent to interact with the object (e.g. via gazing for a predetermined period of time, via voice, gesture, or any other suitable manifestation of intent). It will be understood that these embodiments are described for the purpose of example, and are not intended to be limiting in any manner.

Figure 3:
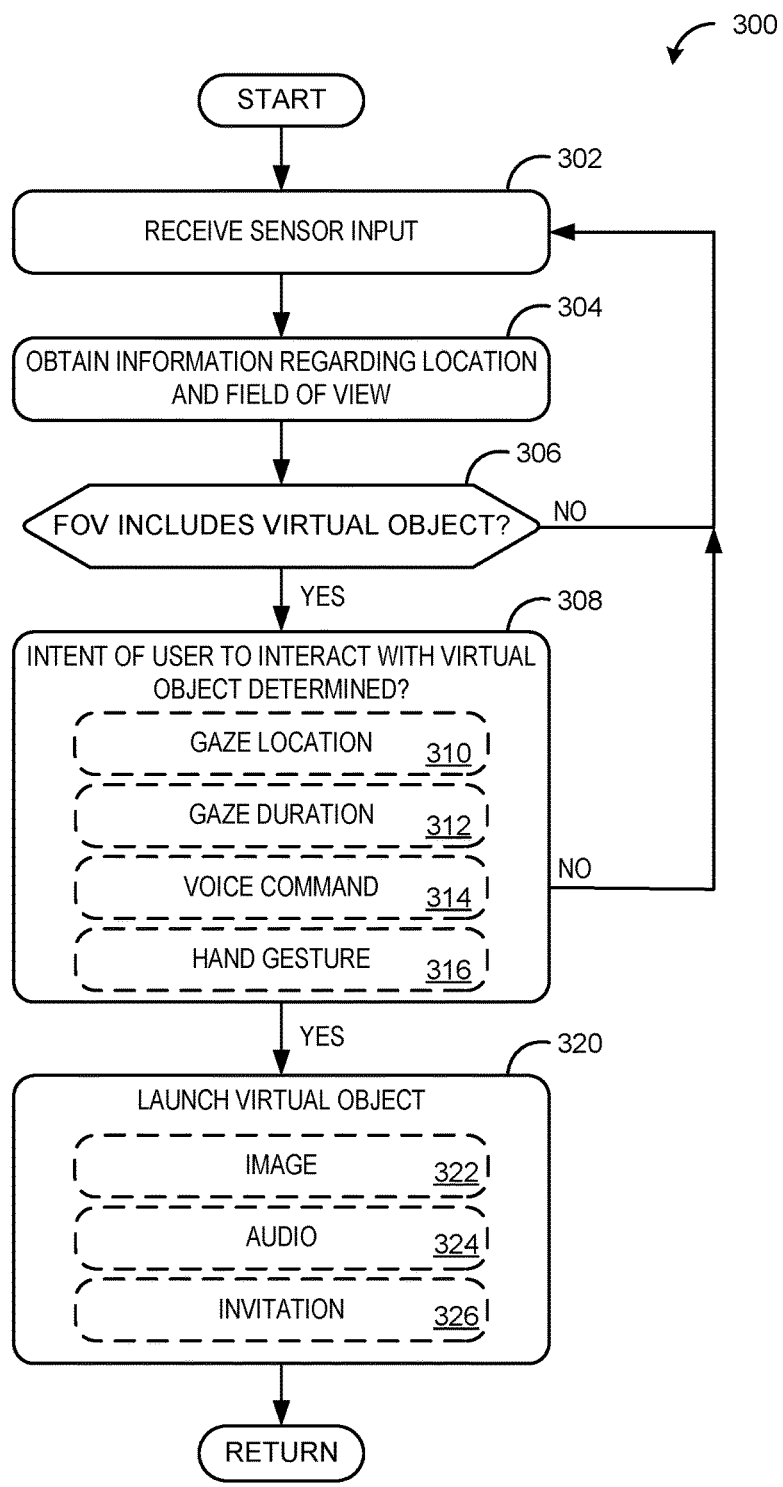
FIG. 3 is a flow chart illustrating a method for interacting with an executable virtual object associated with a real object according to an embodiment of the present disclosure.

FIG. 3 is a flow chart illustrating an embodiment of a method 300 for interacting with an executable virtual object associated with a real object. Method 300 may be performed on any suitable device, including but not limited to a portable see-through head mounted display device, such as HMD device 106. Method 300 includes, at 302, receiving input from one or more sensors coupled to or otherwise in communication with the device. The sensor input may include input from one or more outward facing image sensors, inward facing image sensors, microphones, motion sensors, global positioning satellite (GPS) receivers, and/or any other suitable sensors. Next, at 304, information regarding a location and field of view of a user of the device may be obtained via the data from the sensors. For example, the location may be determined via GPS data, via a network-accessible remote location to which sensor input may be provided, and/or in any other suitable manner. As a more detailed example, image data captured by outward facing image sensors may be provided to a remote location service for comparison to previously captured images held in a remote database. Additional data, such as network access point information, GPS data, etc. may be provided to the remote location service to assist with this determination. Likewise, such image data, as well as information from one or more motion sensors, also may be used to determine an orientation and field of view of the user. It will be understood that information may be provided to the remote location service at the option of the user, such that the user may enable or disable locating services at the user's option.

At 306, method 300 includes determining if the field of view of the user includes a real object with an associated executable virtual object. For example, once the field of view and location of the user are determined, the device may send a request to a remote service for information regarding any virtual objects associated with real objects in the current field of view.

In some embodiments, depending on the distance the user is from the real object, the real object may be identified by different mechanisms. For example, a depth map may be generated for closer objects and the object identified based on characteristics of the depth map. For objects further from the user, image processing combined with location-based data may be used to identify the real object in the field of view.

Additionally, in some embodiments when a user enters a location within a threshold range of one or more virtual objects, such as within ten feet, thirty feet, etc., the information regarding the virtual objects within range may be sent to the user's device, regardless of whether the real object associated with the virtual object is within the user's field of view. Such preloading of the virtual object may allow the virtual object to be launched more quickly if the user chooses to interact with it. Such proximity also may trigger notification to the user of the virtual object. Further, a different notification may be provided for virtual objects associated with real objects in a current field of view and virtual objects associated with real objects not in a current field of view.

Further, in some embodiments, virtual objects associated with nearby real object may be discovered (or notification of such objects presented) upon user request. As a more specific example, a user may trigger a virtual object discovery or notification process by voice command, such as by asking "what's in here" upon entering a museum. In response to such a command, interactive virtual objects may be highlighted on the see-through display system, or any other suitable notification may be presented (e.g. by visual and/or audio mechanism).

If the user's field of view does not contain a real object with an associated executable virtual object, method 300 returns to 302 to continue to receive sensor input. On the other hand, if the field of view does contain a real object with an associated executable virtual object, method 300 then determines at 308 whether the user has an intent to interact with the object.

The user's intent to interact with the object may be determined in any suitable manner. For example, as mentioned above, determining the user's intent to interact may include determining a gaze location of the user at 310 and gaze duration at 312. The gaze location and duration of the user may be determined based on one or more inward-facing image sensors that are configured to track eye movements of the user. In other embodiments, the intent to interact may be determined by a voice command at 314, by a hand gesture at 316, and/or by any other suitable input or combination of inputs (e.g. detecting that the gaze of the user is directed at the object and that the user has issued a voice command indicating an intent to interact). Further, a user's intent to interact with a virtual object also may be detected based upon proximity of the user to the real object. Continuing, if no intent to interact is detected, method 300 returns to 308 to continue to determine user intent. On other hand, if an intent to interact is determined, then method 300 comprises, at 320, launching the executable virtual object. The executable virtual object may include image content 322, audio content 324, game invitations 326, and/or other virtual objects that may be executed on the device.

In some instances, the executable virtual object may be stored locally on the device. In such instances, launching the virtual object may include displaying image data related to the virtual object on a display of the device, or sending audio data related to the virtual object to an audio output of the device. In other instances, the virtual object may be located remotely from the device, and launching the virtual object may include retrieving the virtual object from a remote location, or launching the virtual object by sending an instruction to launch the virtual object to the remote location.

As mentioned above, in some embodiments, a user may associate a virtual object with a real object while physically at the location of the real object. For example, a user located at a tourist attraction may take a photograph that captures the tourist attraction from a unique perspective. The user may then associate the picture with the tourist attraction, such as by pointing to the tourist attraction and issuing a voice command to associate the picture with the attraction. The picture will become the virtual object that is associated with the real object (i.e. the tourist attraction), and other users who visit the tourist attraction may launch the virtual object in order to view the photograph. A user may similarly leave an audio object and/or a video object created by the user while at the tourist attraction. For example, a user may create audio and/or video instructions regarding how to photograph the tourist attraction in particular lighting conditions such that later visitors to the attraction may later play back the instructions. It will be understood that these particular methods of creating virtual objects for association with real objects are presented for the purpose of example, and are not intended to be limiting in any manner.

In other instances, the association of a virtual object with a real object may be performed when the user is not physically located at the real object. For example, a user may associate a virtual object with a global coordinate on a map via a map service, via previously acquired image data capturing an image of the object, or in any other suitable manner. In one example, this may include a user "sending" an invitation to a party to a friend. The user may associate the virtual object, in this example the invitation, with a selected real object (e.g., the friend's front door) via a map on the user's personal home computing device, such that when the friend is in proximity to the real object, the friend may launch the virtual object to receive the invitation.

Figure 4:
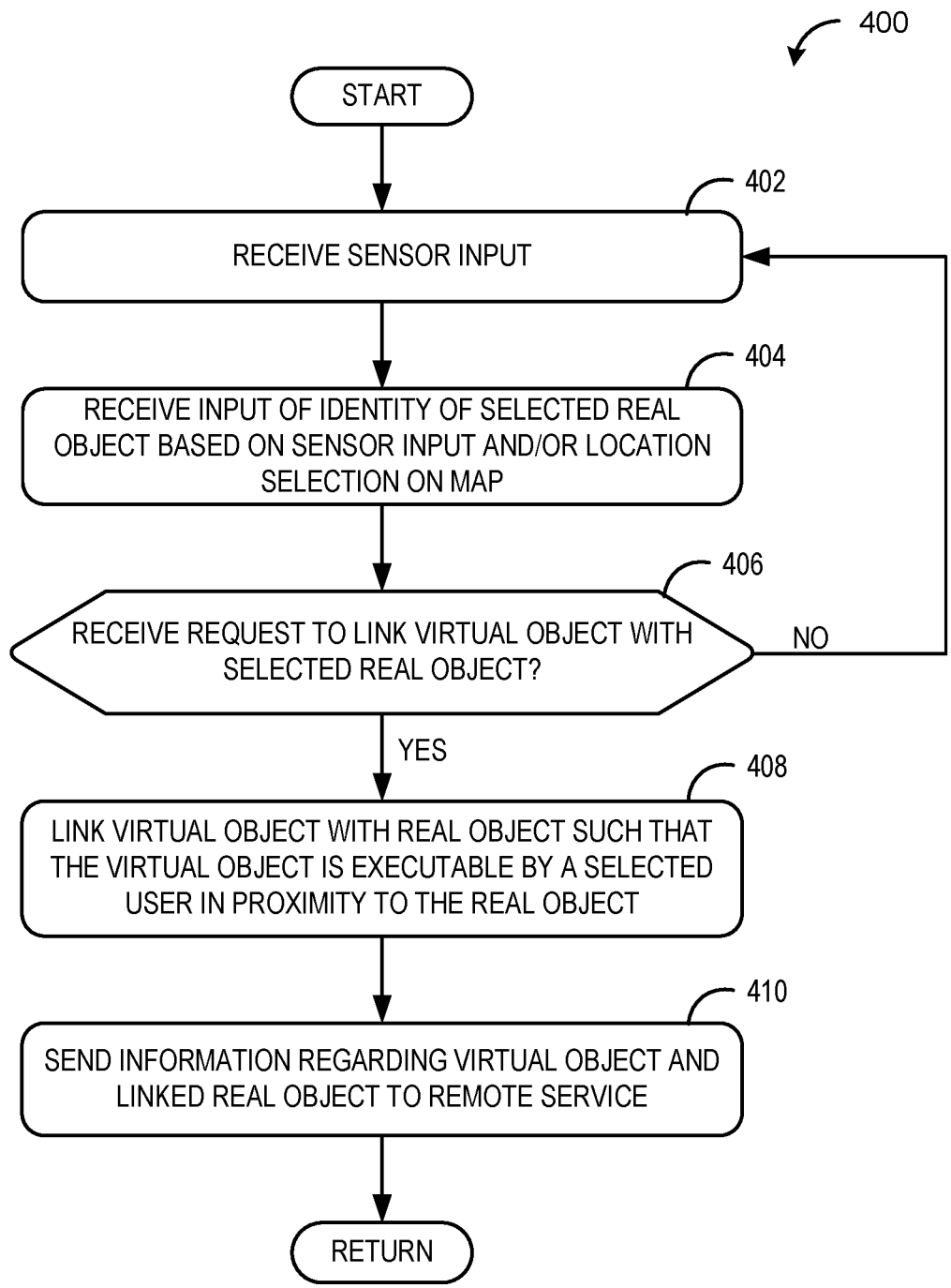
FIG. 4 is a flow chart illustrating a method for associating a virtual object with a selected real object according to an embodiment of the present disclosure.

FIG. 4 shows a flow diagram depicting an embodiment of a method 400 for associating a user-specified executable virtual object with a real object. Method 400 may be carried out on a portable see-through display device, such as HMD device 106, or on any other suitable device.

Method 400 comprises, at 402, receiving sensor input. As described above with respect to FIG. 3, the sensor input may include image sensor input, motion sensor input, microphone input, GPS input, and/or any other suitable input. This sensor information may be used to determine a location and field of view of the user of the device, and may be used to identify real objects in the field of view of the user. At 404, method 400 includes receiving an input of an identity of a selected real object based on one or more of input received from one or more sensors of the see-through display device and a selection of a location on a map. In some embodiments, this may also include determining which object from a plurality of real objects in the field of view is a selected real object based on the sensor input. For example, the user may select a real object by looking at the object for a threshold amount of time, by looking at the object and issuing a voice command, and/or in any other suitable manner.

At 406, method 400 includes determining if a request to link the selected real object with a user-specified executable virtual object has been received, such that the virtual object is executable by a selected user in proximity to the real object. The determination may be based on information received from the sensors, for example by a voice command or hand gesture of the user. If a request is not received, method 400 returns to 402 to continue to receive sensor input. If a request to link a user-specified virtual object with the selected real object is received, method 400 proceeds to 408 to link the user-specified virtual object and the selected real object. Linking the virtual object to the real object may include sending information regarding the linked objects to a remote service at 410.

The virtual object to be linked with the real object may be stored locally on the device, such as a still or video image acquired by the device and/or audio content recorded by the device. In such instances, the actual virtual object may be sent to the remote service along with information linking the virtual object to the real object. In other embodiments, the virtual object may be stored remotely from the device, and information regarding a location of the virtual object may be sent to the remote service so that other users at the physical location of the real object may be presented with the opportunity to interact with the virtual object. In such embodiments, a user may locate the virtual object by navigating via a user interface displayed on the see-through display device to a network location at which the virtual object is stored.

As mentioned above, in other instances the association of a virtual object with a real object may be performed when the user is not physically located at the real object. For example, a user may associate a virtual object with a global coordinate on a map via a map service, via previously acquired image data capturing an image of the object, or in any other suitable manner.

A virtual object associated with a real object may be configured to be public (e.g. access to the virtual object is unrestricted) or private (e.g. access to the virtual object is restricted in some way). For example, a user associating a game play invitation with a location may choose to restrict the invitation to his or her circle of friends. This may be accomplished by sending additional information to the remote service, such as a contacts list of the user, a list of friends of the user from a social networking site, etc. Then, when another user is at the location of the real object and wishes to interact with the virtual object, the user may be verified prior to notification of and/or launching of the virtual object. For example, the HMD device of the user wishing to interact with the object may send information to a remote service to authenticate the user.

As another non-limiting example, a user may associate a restaurant review with a real object at or near the reviewed restaurant (e.g. a sign identifying the restaurant). If the user desires to allow any users near the restaurant to read his or her review before entering the restaurant, the user may choose to allow all users to interact with the virtual object. On the other hand, if the user wishes to allow only selected friends to view the review (e.g. members of a restaurant-related social networking group), the user may restrict access to the review to that group of people. Further, in some embodiments, a virtual object may be public but presented differently for different users. In the example above, the restaurant review may launch as an audio content item for some users but may launch as a text object for other users. This may be determined based on preset preferences of users, or based upon any other suitable criteria.

As another non-limiting example, a virtual object may be configured to guide a user to one or more other real objects. For example, a realtor may associate an augmented reality tour with a house for sale, which may launch based upon proximity (or other measure of intent) when the user enters through the door of the house. Contextual information related with each room of the house may be used to guide the user through the house in a particular path and guide a user's eyes to particular features of interest in the house. Further, such a virtual object may allow visitors touring the house to leave messages (e.g. audio and/or video data comprising comments made by the user) for others (e.g. a spouse or other family members) that may tour the house later. As another example, a party invitation may be associated with a mailbox. When launched, the virtual object may guide a user to the location of the party via virtual breadcrumbs, for example. Once at the location of the party, another virtual object may be launched to announce the arrival of the user. In this way, the initial virtual object may lead the user to one or more additional virtual objects.

As mentioned above, a virtual object may be associated with a real object in the form of a global coordinate or other location identifier. For example, a virtual object may be associated with a location that previously included an object that is no longer present, such as an archeological site. In such circumstances, the virtual object may be associated with the global coordinates of that location.

Any suitable device may be used to execute virtual objects associated with real objects, and/or to associate virtual objects with real objects, as described herein. Example devices include, but are not limited to, HMD devices, such as HMD device 106 of FIG. 1. FIG. 5 shows an example embodiment of HMD device 106 including a see-through display system 500, and FIG. 6 shows a block diagram of the see-through display system 500.

The see-through display system 500 comprises one or more lenses 502 that form a part of a see-through display subsystem 504, such that images may be projected onto the lenses 502, or produced by image-producing elements (e.g. see-through OLED displays) located within the lenses 502. The see-through display system 500 further comprises one or more outward facing image sensors 506 configured to acquire images of a background scene being viewed by a user, and may include one or more microphones 508 configured to detect sounds, such as voice commands from a user. The outward facing image sensors 506 may include one or more depth sensors and/or one or more two-dimensional image sensors.

The see-through display system 500 further comprises a gaze detection subsystem 510 configured to detect a direction of gaze of each eye of a user, as described above. The gaze detection subsystem 510 may be configured to determine gaze directions of each of a user's eyes in any suitable manner. For example, in the depicted embodiment, the gaze detection subsystem 510 comprises one or more glint sources 512, such as infrared light sources, configured to cause a glint of light to reflect from each eyeball of a user, and one or more image sensors 514 configured to capture an image of each eyeball of the user. Changes in the glints from the user's eyeballs as determined from image data gathered via image sensor(s) 514 may be used to determine a direction of gaze. Further, a location at which gaze lines projected from the user's eyes intersect the external display may be used to determine an object at which the user is gazing (e.g. a virtual object displayed on an external display). The gaze detection subsystem 510 may have any suitable number and arrangement of light sources and image sensors. In one non-limiting example embodiment, four glint sources and one image sensor are used for each eye.

The see-through display system 500 may further comprise additional sensors. For example, see-through display system 500 may comprise a global positioning (GPS) subsystem 516 to allow a location of the see-through display system 500 to be determined. Information regarding the user's location may then be used, for example, to help determine the identity of an object on an external display at which the user is gazing. As one example, location information may be used to determine that a user is in a particular movie theater. This information may then be used to help identify contextual information, for example, by identifying a movie playing at that particular time in that particular theater and actors starring in that particular movie. Likewise, the see-through display system 500 may comprise a clock (not shown) or otherwise be configured to receive a remotely generated time signal, to provide additional information that may be used to determine the context of a user's current environment. For example, information regarding the time that the user is in the particular movie theater may allow the identity of a movie being watched to be determined. This information may then be used by the see-through display system 500 to retrieve and present information relevant to objects in the movie being watched.

The see-through display system 500 further may include one or more motion sensors 518 to detect movements of a user's head when the user is wearing the see-through display system 500. Motion data may be used, potentially along with eye-tracking glint data and outward-facing image data, for gaze detection, as well as for image stabilization to help correct for blur in images from the outward-facing image sensor(s) 506. The use of motion data may allow changes in gaze location to be tracked even if image data from the outward-facing image sensor(s) 506 cannot be resolved. Likewise, the motion sensors 518, as well as the microphone(s) 508 and the gaze detection subsystem 510, also may be employed as user input devices, such that a user may interact with see-through display system 500 via gestures of the eye, neck and/or head, as well as via verbal commands. It will be understood that sensors illustrated in FIGS. 5 and 6 are shown for the purpose of example and are not intended to be limiting in any manner, as any other suitable sensors and/or combination of sensors may be utilized.

The see-through display system 500 further comprises a controller 520 having a logic subsystem 522 and a data holding subsystem 524 in communication with the sensors, the gaze detection subsystem 510, and the see-through display subsystem 504. The data holding subsystem 524 comprises instructions stored thereon that are executable by logic subsystem 522, for example, to receive and interpret inputs from the sensors, to determine an object at which the user is gazing, to send information (e.g. image data) to an external computing device for identification of the object via a communications subsystem 526, and to receive and potentially present contextual information regarding the object via the see-through display subsystem 504, and/or via one or more speakers 528. It will be understood that data holding subsystem 524 also may store information regarding other objects displayed on the external display screen (e.g. a list of user interface controls locations and identities/functions).

It will be appreciated that the HMD device 106 is provided by way of example, and thus is not meant to be limiting. Therefore it is to be understood that the HMD device may include additional and/or alternative sensors, cameras, microphones, input devices, output devices, etc. than those shown without departing from the scope of this disclosure. Further, the physical configuration of an HMD device and its various sensors and subcomponents may take a variety of different forms without departing from the scope of this disclosure.

In some embodiments, the above described methods and processes may be tied to a computing system including one or more computers. In particular, the methods and processes described herein may be implemented as a computer application, computer service, computer API, computer library, and/or other computer program product.

Figure 7:
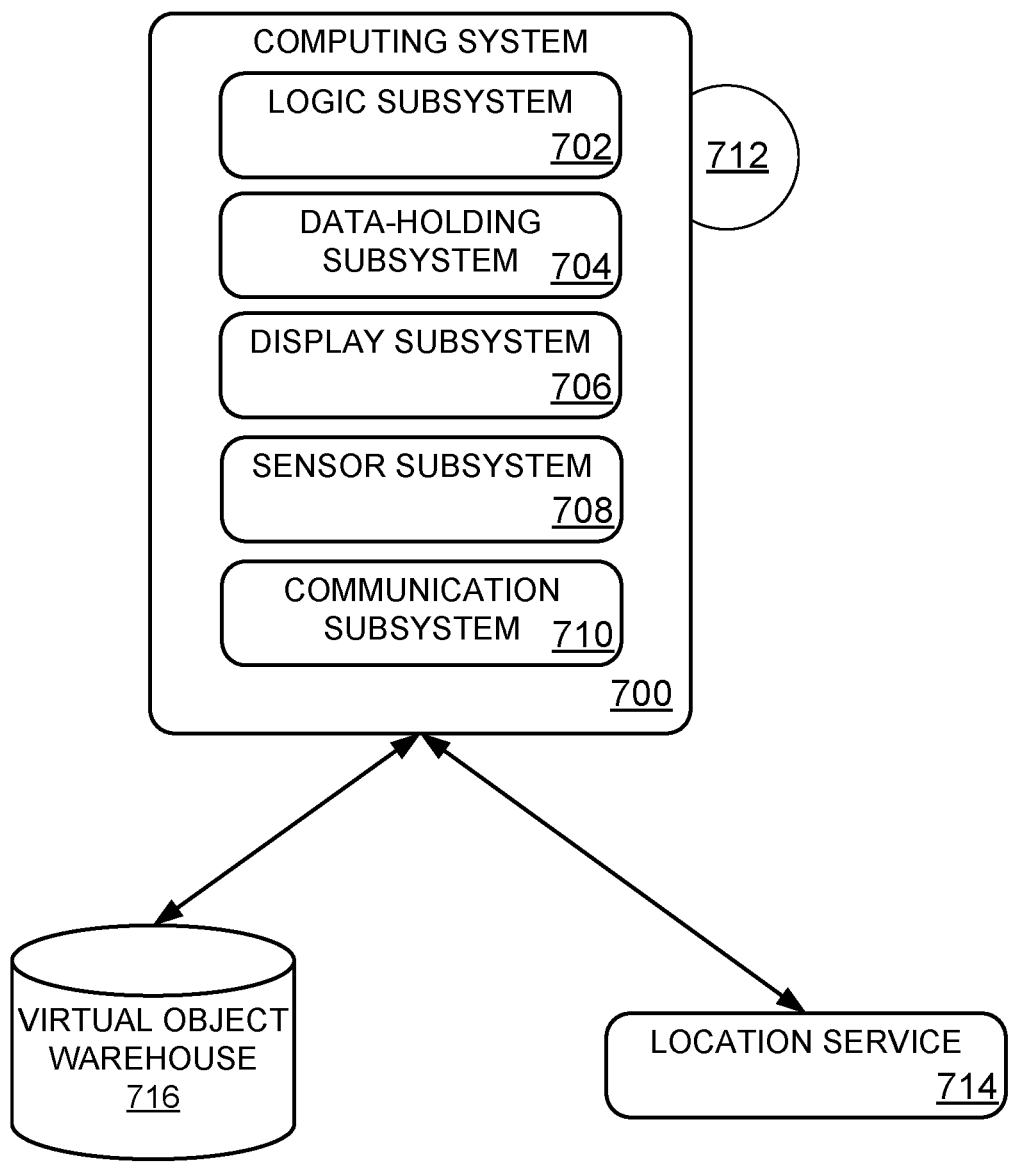
FIG. 7 is a non-limiting example of a computing system.

FIG. 7 schematically shows a nonlimiting computing system 700 that may perform one or more of the above described methods and processes. For example, the HMD device 106 may be a computing system, such as computing system 700. As another example, computing system 700 may be a computing system separate from the HMD device 106, but communicatively coupled to HMD device 106. Further, the HMD device 106 may be communicatively coupled with other computing devices, such as network-accessible services for determining location, storing and providing virtual objects associated with real objects, and any other suitable computing system.

Computing system 700 is shown in simplified form. It is to be understood that virtually any computer architecture may be used without departing from the scope of this disclosure. In different embodiments, computing system 700 may take the form of a mainframe computer, server computer, desktop computer, laptop computer, tablet computer, home entertainment computer, network computing device, mobile computing device, mobile communication device, gaming device, head-mounted display device, etc.

Computing system 700 includes a logic subsystem 702 and a data-holding subsystem 704. Computing system 700 may optionally include a display subsystem 706, communication subsystem 710, and/or other components not shown in FIG. 7. Computing system 700 may also optionally include user input devices such as keyboards, mice, game controllers, cameras, microphones, and/or touch screens, for example.

Logic subsystem 702 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 704 may include one or more physical, non-transitory, devices configured to hold data and/or instructions executable by the logic subsystem to implement the herein described methods and processes. When such methods and processes are implemented, the state of data-holding subsystem 704 may be transformed (e.g., to hold different data).

Data-holding subsystem 704 may include removable media and/or built-in devices. Data-holding subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data-holding subsystem 704 may be integrated into one or more common devices, such as an application specific integrated circuit or a system on a chip.

FIG. 7 also shows an aspect of the data-holding subsystem in the form of removable computer-readable storage media 712, which may be used to store and/or transfer data and/or instructions executable to implement the herein described methods and processes. Removable computer-readable storage media 712 may take the form of CDs, DVDs, HD-DVDs, Blu-Ray Discs, EEPROMs, and/or floppy disks, among others.

It is to be appreciated that data-holding subsystem 704 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 700 that is implemented to perform one or more particular functions. In some cases, such a module, program, or engine may be instantiated via logic subsystem 702 executing instructions held by data-holding subsystem 704. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 706 may be used to present a visual representation of data held by data-holding subsystem 704. For example, display subsystem 706 may be a see-through display, as described above. As the herein described methods and processes change the data held by the data-holding subsystem, and thus transform the state of the data-holding subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or data-holding subsystem 704 in a shared enclosure, or such display devices may be peripheral display devices.

Communication subsystem 710 may be configured to communicatively couple computing system 700 with one or more other computing devices. For example, in the instance of a HMD computing device, communication subsystem 710 may be configured to communicatively couple computing system 700 to one or more other HMD devices, a gaming console, or another device. Communication subsystem 710 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

Sensor subsystem 708 may include one or more sensors configured to sense different physical phenomenon (e.g., visible light, infrared light, acceleration, orientation, position, etc.), as described above. For example, the sensor subsystem 708 may comprise one or more image sensors, motion sensors such as accelerometers, touch pads, touch screens, and/or any other suitable sensors. Therefore, sensor subsystem 708 may be configured to provide observation information to logic subsystem 702, for example. As described above, observation information such as image data, motion sensor data, and/or any other suitable sensor data may be used to perform such tasks as determining a particular gesture performed by the one or more human subjects.

In some embodiments, sensor subsystem 708 may include a depth camera (e.g., outward facing sensor 506 of FIG. 5). The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots). The depth camera may be configured to image the structured illumination reflected from a scene onto which the structured illumination is projected. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, sensor subsystem 708 may include a visible light camera. Virtually any type of digital camera technology may be used without departing from the scope of this disclosure. As a non-limiting example, the visible light camera may include a charge coupled device image sensor.

Computing system 700 may be configured to communicate with remote computing systems, such as a location service 714, a virtual object warehouse 716, and/or any other suitable remote computing system. The location service 714 may receive information from computing system 700, use the information to determine the location of the computing system 700, and provide the location information to the computing system 700. The virtual object warehouse 716 may store information linking executable virtual objects to real objects, and/or may store the actual executable virtual objects for provision to requesting computing devices. The virtual object warehouse 716 may also include additional information, such as verification/authentication information for private executable virtual objects.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A portable display device, comprising:
one or more sensors including an image sensor;
a logic subsystem; and
a data-holding subsystem holding instructions executable by the logic subsystem to receive sensor input from the image sensor,
determine whether a field of view includes a real object comprising an associated executable virtual object based at least on the sensor input,
based at least on a determination that the field of view includes the real object comprising the associated executable virtual object, determine an intent of a user to interact with the associated executable virtual object, and
based at least on a determination of the intent of the user to interact with the associated executable virtual object, launch the executable object.

2. The portable display device of claim 1, where the executable virtual object is executable to display an image on the portable display device.

3. The portable display device of claim 1, where the executable virtual object is executable to present an audio content item.

4. The portable display device of claim 1, where the executable virtual object is executable to present an invitation to join an activity.

5. The portable display device of claim 1, wherein the image sensor is an outward-facing image sensor, and wherein the one or more sensors further comprises one or more of an inward facing image sensor, a microphone, and a motion sensor.

6. The portable display device of claim 5, wherein the instructions are executable to determine an intent of the user to interact with the associated executable virtual object by determining that a gaze of the user is directed at the real object for a threshold amount of time.

7. The portable display device of claim 5, wherein the instructions are executable to determine an intent of the user to interact with the associated executable virtual object by detecting one or more of a voice command of the user and a gesture of the user indicating the intent of the user to interact with the executable virtual object.

8. On a portable display device, a method for interacting with an executable virtual object associated with a real object, the method comprising:
receiving sensor input from one or more sensors of the portable display device, the sensor input comprising image data;
determine whether a field of view of the image data includes a real object comprising an associated executable virtual object;
based at least on determining that the field of view includes the real object comprising the associated executable virtual object, determining an intent of the user to interact with the executable virtual object; and
based at least on determining the intent of the user to interact with the associated executable virtual object, interacting with the executable object.

9. The method of claim 1, wherein interacting with the executable object further comprises retrieving the executable virtual object from a remote location and launching the executable object on the portable display device.

10. The method of claim 1, wherein interacting with the executable object further comprises sending a request to a remote location to launch the executable virtual object.

11. The method of claim 1, wherein determining the intent of the user to interact with the executable object comprises determining that a gaze of the user is directed at the real object for a threshold amount of time.

12. The method of claim 1, wherein determining the intent of the user to interact with the executable object comprises detecting one or more of a voice command of the user and a gesture of the user indicating the intent of the user to interact with the executable virtual object.

13. The method of claim 1, further comprising receiving contextual information regarding the real object, and wherein interacting with the virtual object comprises receiving information regarding a nearby real object that is associated with a second executable virtual object.

14. The method of claim 1, wherein the virtual object is a private virtual object, and further comprising receiving information authenticating the user to interact with the virtual object.

15. A portable display device, comprising:
one or more sensors including an image sensor;
a logic subsystem; and a data-holding subsystem holding instructions executable by the logic subsystem to receive image data from the image sensor,
  send a request to a remote device for information regarding any executable virtual objects associated with a real object in a current field of view of the image sensor,
  receive from the remote device information regarding an executable virtual object associated with the real object in the current field of view, the executable virtual object being executable to provide information regarding an event,
  verify, via a list of users permitted to view the information regarding the event, that a user of the portable display device is permitted to view the information regarding the event,
  determine an intent of the user of the portable display device to interact with the executable virtual object, and
  launch the executable virtual object to present information regarding the event.

16. The portable display device of claim 15, wherein the instructions are further executable to output a notification of the executable virtual object after verifying that the user of the portable display device is permitted to view the information regarding the event.

17. The portable display device of claim 16, wherein the instructions are executable not to output the notification and not to launch the executable object when it is determined that the user of the portable display device is not permitted to view the information regarding the event.

18. The portable display device of claim 15, wherein the event comprises one or more of an augmented reality game, a party, a tour of a location, and a phone call.

19. The portable display device of claim 15, wherein the executable virtual object is executable to provide guidance information regarding directions to the event.

20. The portable display device of claim 15, wherein the executable virtual object is executable to provide information left by an earlier user related to a tour of a location.

* * * * *